(12) United States Patent
Zeng (10) Patent No.: US 12,456,098 B2
(45) Date of Patent: Oct. 28, 2025

(54) SYSTEM AND METHOD FOR MATCHING TRUCKING VEHICLES

(71) Applicant: ANYTREK CORPORATION, Ontario, CA (US)

(72) Inventor: Haijian Zeng, Shenzhen (CN)

(73) Assignee: ANYTREK CORPORATION, Ontario, CA (US)

( * ) Notice: Subject to any disclaimer, the term of this patent is extended or adjusted under 35 U.S.C. 154(b) by 136 days.

(21) Appl. No.: 18/467,628

(22) Filed: Sep. 14, 2023

(65) Prior Publication Data

US 2024/0127178 A1 Apr. 18, 2024

Related U.S. Application Data

(60) Provisional application No. 63/379,153, filed on Oct. 12, 2022.

(51) Int. Cl.
*G06Q 10/087* (2023.01)
*B60D 1/62* (2006.01)

(52) U.S. Cl.
CPC ............ *G06Q 10/087* (2013.01); *B60D 1/62* (2013.01)

(58) Field of Classification Search
CPC .................................. G06Q 10/087; B60D 1/62
See application file for complete search history.

(56) References Cited

U.S. PATENT DOCUMENTS

| 9,835,728 B1 * | 12/2017 | Zeng | F21S 43/15 |
| 2006/0261935 A1 * | 11/2006 | McAden | B60R 25/00 |
| | | | 340/431 |
| 2016/0050356 A1 * | 2/2016 | Nalepka | H04N 7/181 |
| | | | 348/148 |

OTHER PUBLICATIONS

Wikipedia, HomePlug, https://en.wikipedia.org/w/index.php?title=HomePlug&oldid=1039853449, 9 pages.
Wikipedia, Power-line communication, https://en.wikipedia.org/w/index.php?title=Power-line_communication&oldid=1001049064, 10 pages.
Wikipedia, Qualcomm Atheros, https://en.wikipedia.org/w/index.php?title=Qualcomm_Atheros&oldid=1008064776, 6 pages.

* cited by examiner

*Primary Examiner* — A. Hunter Wilder
(74) *Attorney, Agent, or Firm* — DANE IP Law PC (57) ABSTRACT

A transportation management system (TMS) includes shipping data concerning a cargo that has been loaded onto a trailer. The trailer has a trailer module comprising a microcontroller and memory upon which a trailer ID is saved. A tractor module can be electrically connected to a tractor, and can communicate with a driver device which is linked to a driver. Shipping data from the TMS is loaded onto the driver device, which communicates at least some of the shipping data and a driver ID to the tractor module. When the tractor is hooked up to the trailer so that the tractor provides electrical power to the trailer, the tractor module and trailer module communicate data with one another via powerline communication. Such data can be communicated to the TMS, which will compare the data with expected data to ensure that the trailer is connected to the correct driver/tractor.

8 Claims, 9 Drawing Sheets

SYSTEM AND METHOD FOR MATCHING TRUCKING VEHICLES

CROSS-REFERENCE TO RELATED APPLICATIONS

This application claims the benefit of priority to U.S. Patent Provisional Application No. 63/379,153, filed on 2022 Oct. 12, the entire contents of which are expressly incorporated herein by reference.

STATEMENT RE: FEDERALLY SPONSORED RESEARCH/DEVELOPMENT

Not Applicable.

BACKGROUND

The present disclosure relates to the field of shipping, and more specifically to matching a load to the correct transportation vehicle.

Road shipping typically involves a tractor, or truck, configured to tow a trailer that is configured to hold cargo to be shipped. The trailers are usually independent of tractors. That is to say, a particular tractor may couple with a different trailer for each voyage.

Because of the sheer volume of commercial trailers in the United States, it can be difficult to keep track of individual trailers. As such, trailers are particularly susceptible to being stolen. Also, many trailers can be stored together in a large lot. Such trailers may look very similar, and there is a risk that a tractor may mistakenly be attached to the wrong trailer, and thus the wrong trailer may be transported to a chosen location.

SUMMARY

The present disclosure discloses aspects that help to ensure that a particular tractor will be coupled to the correct trailer, and also to detect when a trailer is connected to an unauthorized tractor. For example, a tractor module in the tractor may communicate electronically with a trailer module in the trailer when the tractor and trailer are hard wired electrically to one another through a power line. Using the power line to communicate, the trailer module and tractor module can exchange shipping data and identification data, and can communicate such data to a transportation management system (TMS), which will compare the collected data with expected data to determine whether the tractor/driver is connected to the correct trailer.

In accordance with an embodiment, the present specification describes a cargo verification system. A transportation management system (TMS) is configured to generate digital waybill data concerning a cargo that has been loaded onto a trailer. The TMS is configured to communicate digital waybill data to a driver device. A tractor module configured to communicate electronically with the driver device and to be powered by a tractor power system of a tractor, The tractor module receives a driver ID from the driver device. A trailer module is in electrical communication with a trailer power system of the trailer. The trailer module maintains a trailer ID of the trailer in a data memory. The tractor module and the trailer module are configured to exchange data therebetween via power line communication (PLC) when the tractor power system and the trailer power system are connected to one another.

In some versions, the trailer module is configured to communicate the trailer ID and data received from the tractor module to the TMS by wireless communication.

In additional versions, the tractor module is configured to communicate the driver ID and the trailer ID received from the trailer module to the driver device, and the driver device is configured to communicate the driver ID and the trailer ID to the TMS.

In yet additional versions, the tractor module is releasably connected to the tractor power system. In some such versions, the driver device is a mobile device and is configured to wirelessly communicate with the tractor module and the TMS.

In a further version, the trailer module is disguised as a tail light.

In a still further version, the driver device is configured to receive a waybill data from the TMS and to communicate the waybill data and a driver ID to the tractor module. In some such versions, at least one of the tractor module and trailer module is configured to compare the trailer ID and driver ID to the waybill data to determine whether the waybill data is consistent.

In accordance with another embodiment, the present specification describes a method of operating a transportation maintenance system (TMS). The method includes correlating a driver ID to a waybill data concerning a cargo that is loaded on a trailer, and associating the driver ID to a tractor module that is disposed in a tractor. The waybill data is saved in a memory of the TMS. The method includes communicating data between the tractor module and a trailer module that is disposed in the trailer when the trailer is coupled to the tractor, the trailer module having a trailer ID, and communicating data about the driver ID and the trailer ID to the TMS.

In some variations, the tractor module and the trailer module communicate data therebetween via power line communication.

In additional variations, the TMS compares the data received about the driver ID and the trailer ID to waybill data saved in the memory of the TMS. Some variations can additionally comprise generating a confirmation message if the data received is consistent with the saved waybill data, and generating an error message if the data received is inconsistent with the saved waybill data. Other variations can additionally comprise communicating the confirmation message or error message to a driver device and/or a dispatcher.

Further variations can additionally comprise loading at least a portion of the waybill data to a driver device having the driver ID stored thereon, and the driver device communicating the driver ID to the tractor module.

Additional variations additionally comprise saving information about the cargo to a memory of the TMS, the information about the cargo including a trailer ID of the trailer.

DESCRIPTION

A system is disclosed for use with a commercial trailer configured to be hooked up to a tractor and towed to a desired destination. When a tractor and trailer are hooked up, a tractor module pairs with and communicates with a driver device (such as a smartphone) of the driver and a trailer module to establish that the driver has connected to the correct trailer, and that neither the trailer nor the tractor are being stolen. Communication between the tractor module and the trailer module is performed by a wired connection which also transmits power along the power wire(s) of the connected tractor and trailer power systems. As such, the system cannot be hacked because such communication is not being performed wirelessly. A transportation management system (TMS) may have waybill data concerning the cargo and trailer ID, which can be loaded to the driver device (e.g., smartphone). If the tractor has hooked up to the wrong trailer, communication of data between the device driver, tractor module and trailer module will reveal that such data (such as the trailer ID) is inconsistent with data saved on the TMS. A dispatch and/or the driver (via the driver device) can then be alerted that the driver has hooked up to the wrong trailer. If a thief attempts to steal the tractor and trailer, such thief will not have a driver device, and since the driver device is not linked, dispatch can be alerted that the tractor and trailer likely are being stolen. Similarly, if a trailer module senses that the trailer is moved, or if an unauthorized tractor and/or unauthorized driver device is hooked up to the trailer, the trailer module will detect the lack of authorization data and can alert dispatch that the trailer likely is being stolen.

Figure 1:
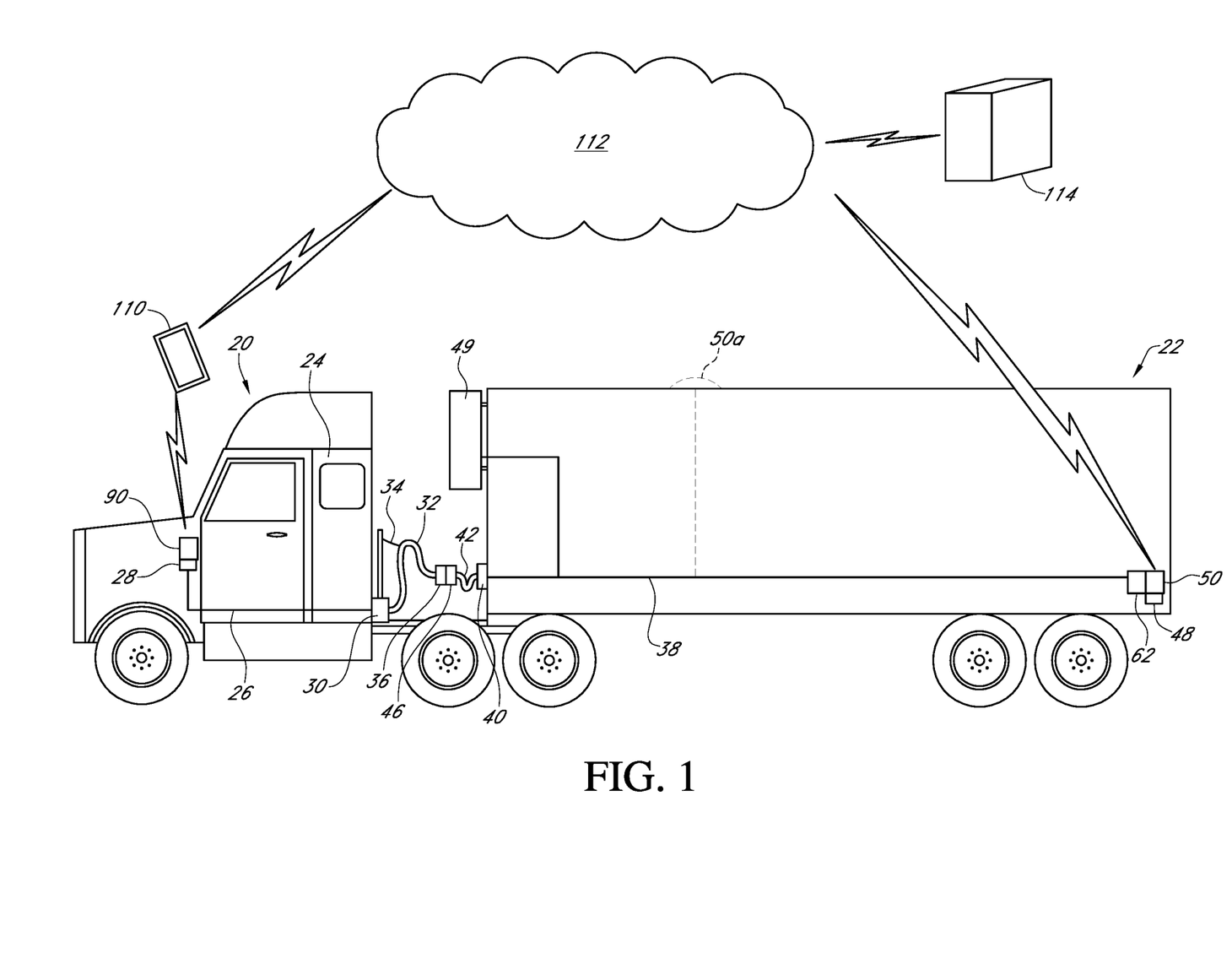
FIG. 1 is a side view of a tractor and trailer connected to one another, and showing certain electrical and communication aspects schematically.

With initial reference to FIG. 1, shipping vehicles can include a tractor 20 and a trailer 22 that can be releasably connected to one another, or "hooked up". The trailer 22 can be loaded with cargo, whether or not it is connected to any tractor 20. When connected, the tractor 20 may tow the trailer 22 to a shipping destination, at which the trailer 22 can have its cargo unloaded and/or new cargo loaded. The tractor 20 can have a cab 24, which includes structure to accommodate a driver that controls the tractor 20.

The tractor 20 may include a tractor power system 26 configured to communicate electrical power via conductive wires to the several systems and structures of the tractor 20, including, for example, a power socket 28 (often in the form of a 12V cigarette lighter). The tractor power system 26 may also be configured to communicate power to the trailer 22. More specifically, a tractor power interface 30 of the tractor power system 26 may communicate with a tractor wire harness 32 that can be supported by a wire hanger 34, and which terminates at a tractor connector 36.

Continuing with reference to FIG. 1, the trailer 22 can have a trailer power system 38 configured to communicate electrical power via conductive wires to various electrical components. A trailer power interface 40 can communicate with a trailer wire harness 42 that terminates in a trailer connector 46. Wires of the trailer power system 38 can communicate the trailer power interface 40 with trailer components such as trailer tail lights 48 or a refrigerator unit 49. When the tractor connector 36 is engaged with the trailer connector 46, the tractor power system 26 is electrically connected with the trailer power system 38 so as to provide electric power to the trailer power system 38. As such, for example, when a driver in the cab 24 brakes, power is supplied to the tail lights 48 so that they will illuminate. Also, power from the tractor 20 can be supplied to operate the refrigerator unit 49. It is to be understood that many configurations of tractors 20 and trailers 22 can be employed. For example, trailers 22 can be configured having large boxes, or containers, as illustrated. Other types of trailers 22 include flatbed configurations, tanker configurations, and more. Also, some trailers 22 may or may not include particular components such as refrigerator units 49, temperature gauges, braking systems, or the like.

Figure 2:
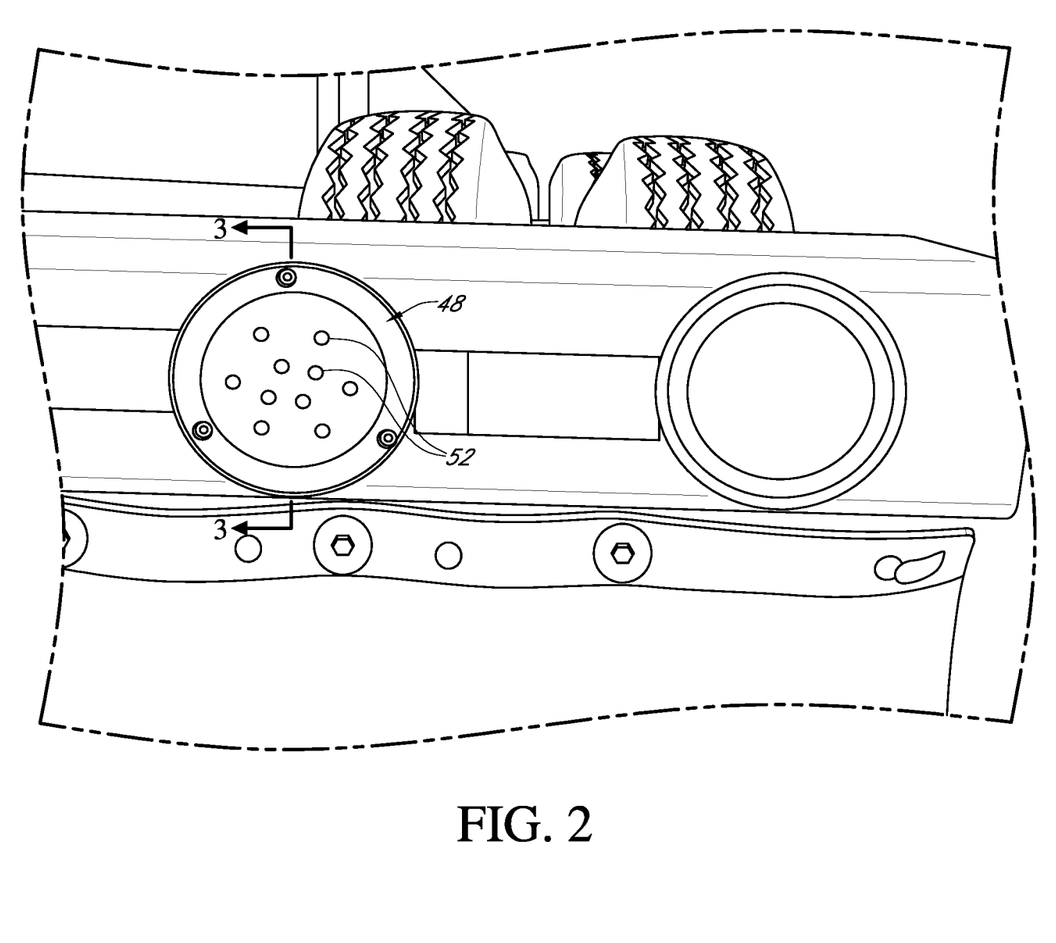
FIG. 2 is a back view of a portion of the trailer having an LED tail light that incorporates a trailer module therewithin.
Figure 3:
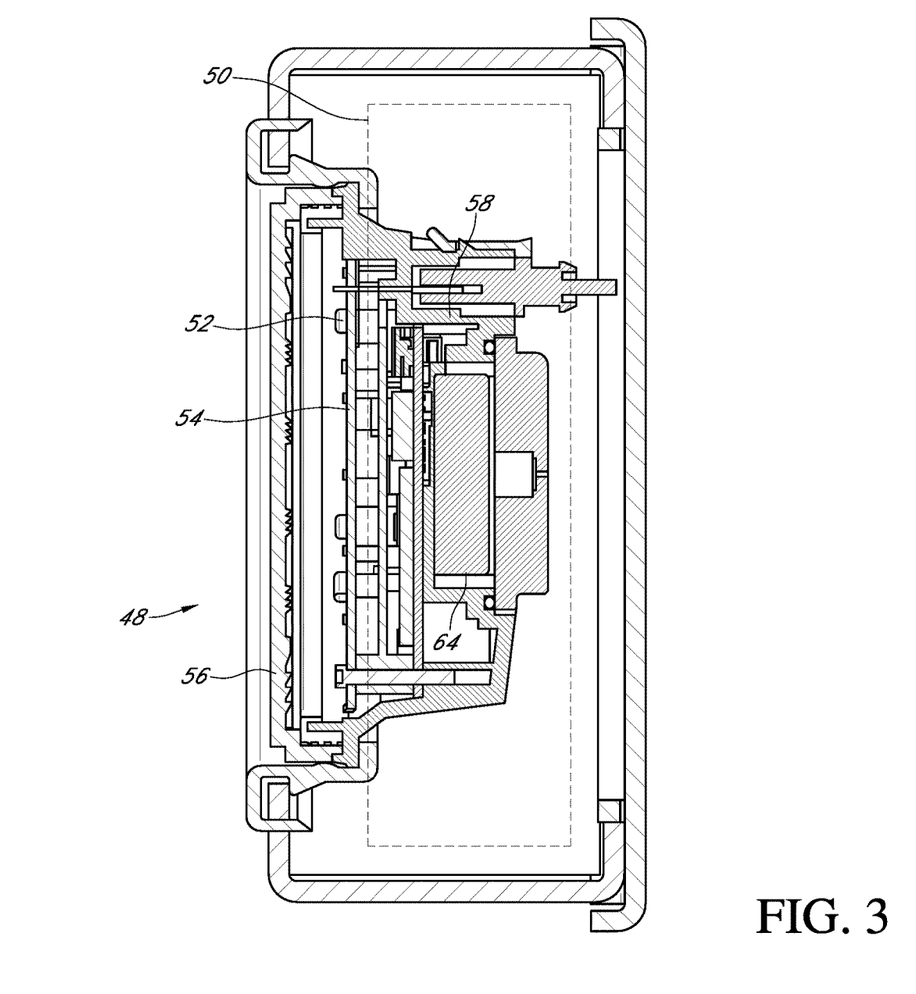
FIG. 3 is a cross-sectional view taken along line 3-3 of FIG. 2.
Figure 4:
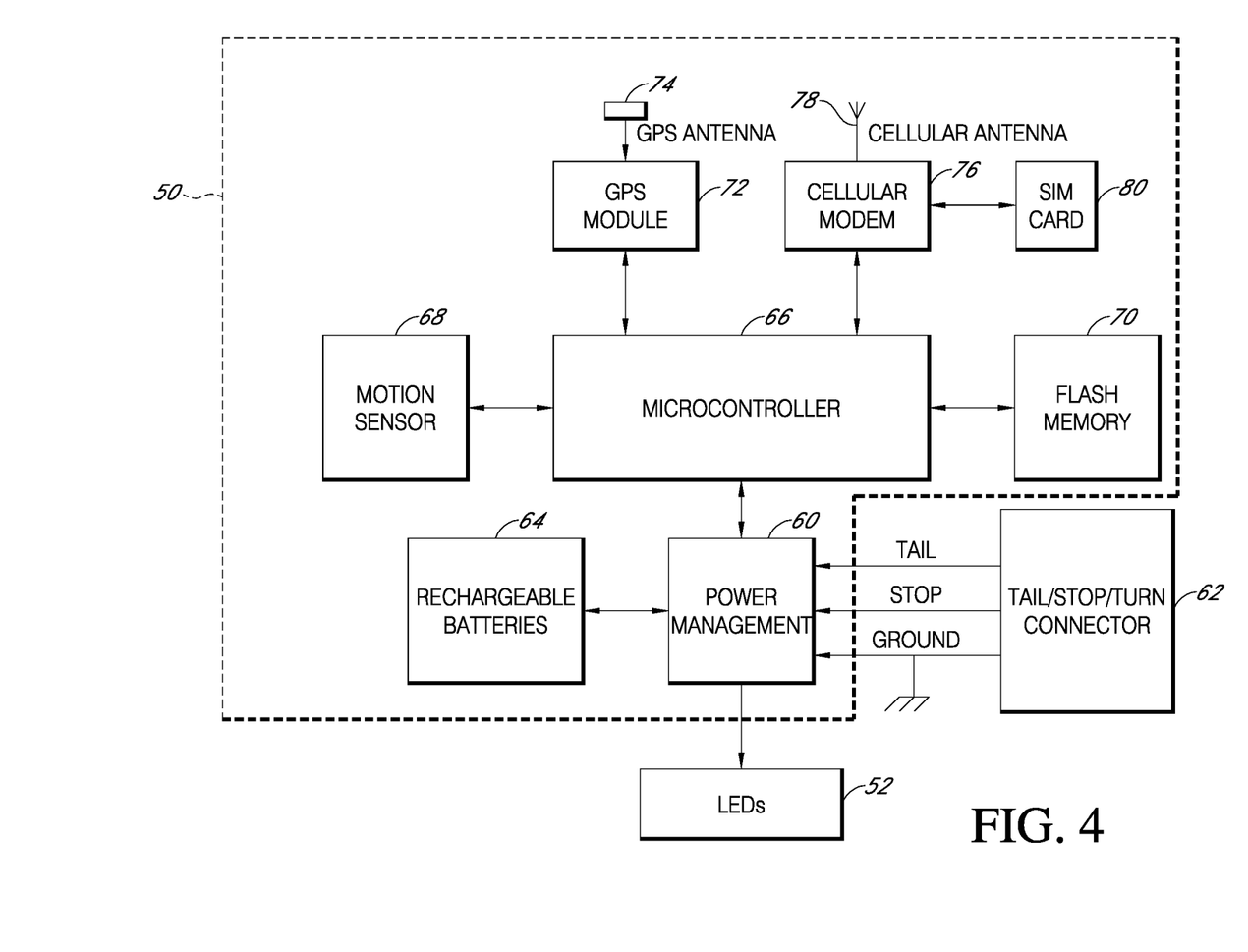
FIG. 4 is a schematic diagram of the LED tail light of FIG. 2, including the trailer module.

Preferably, the trailer 22 includes a trailer module 50 that receives electrical power from the trailer power system 38. With particular reference next to FIGS. 2-4, the illustrated trailer module 50 is combined with one of the tail lights 48 in a manner similar to the GPS Tracking System discussed in detail in U.S. Pat. No. 11,047,986, the entirety of which is hereby incorporated by reference. As such, the trailer module 50 is incorporated into, and disguised as, one of the tail lights 48. The tail light 48 also incorporates a plurality of LEDs 52 mounted onto a printed circuit board (PCB) 54 and enclosed within a lens 56 and housing 58.

Continuing with reference to FIGS. 2-4, the trailer module 50 (see FIG. 3) preferably is enclosed within the housing 58 (see FIG. 3) and hidden behind the LED PCB 54 (see FIG. 3). The trailer module 50 can include multiple electronic components and modules such as a power management module 60 (see FIG. 4) that can accept power from leads 62 of the trailer power system 38. Such leads 62 may communicate power and signals for the tail lights 48, such as to power running lights, brake lights, turn indicators, and the like. The power management module 60 will communicate such power to the LEDs 52 as appropriate, and will also communicate power to a rechargeable battery 64.

As shown specifically in FIG. 4, the power management module 60 can also supply power to a microcontroller 66, which is configured to instruct, interact and control various components, which may include a motion sensor 68, a flash memory 70 configured to provide dynamic memory storage for the microcontroller 66 to store data, and a GPS module 72 with an accompanying GPS 74 antenna. The microcontroller 66 can also be linked to a cellular modem 76 and associated cellular antenna 78. As appropriate, a SIM card 80 can be provided with and for the cellular modem 76. The flash memory 70 can be configured to retain all sorts of data. Preferably, however, the flash memory 70 retains at least a trailer ID, which can be an alphanumeric identification code of the particular trailer.

The trailer module 50 can be configured to provide a GPS tracking system as discussed in the '986 patent, which has been incorporated herein by reference. Preferably, the trailer module 50 is further configured to send and receive data communicated through the leads 62 of the trailer power system 38 in addition to electrical power. Such data can be communicated through one or more power line communication (PLC) technologies such as HomePlug, and the microcontroller 66 can be configured with a chipset compatible with such PLC technologies, such as the HomePlug AV chipset available from Qualcomm® Atheros®.

Figure 5:
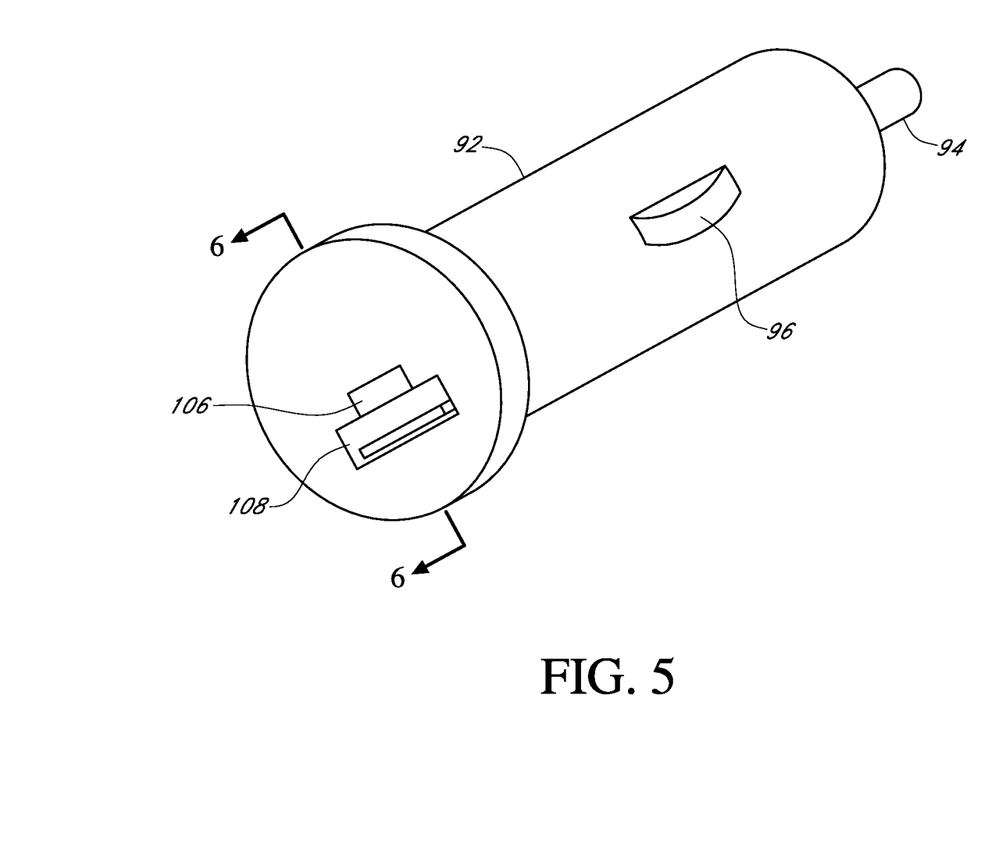
FIG. 5 is a perspective view of an embodiment of a tractor module configured to imitate a cigarette-lighter based device charger.
Figure 6:
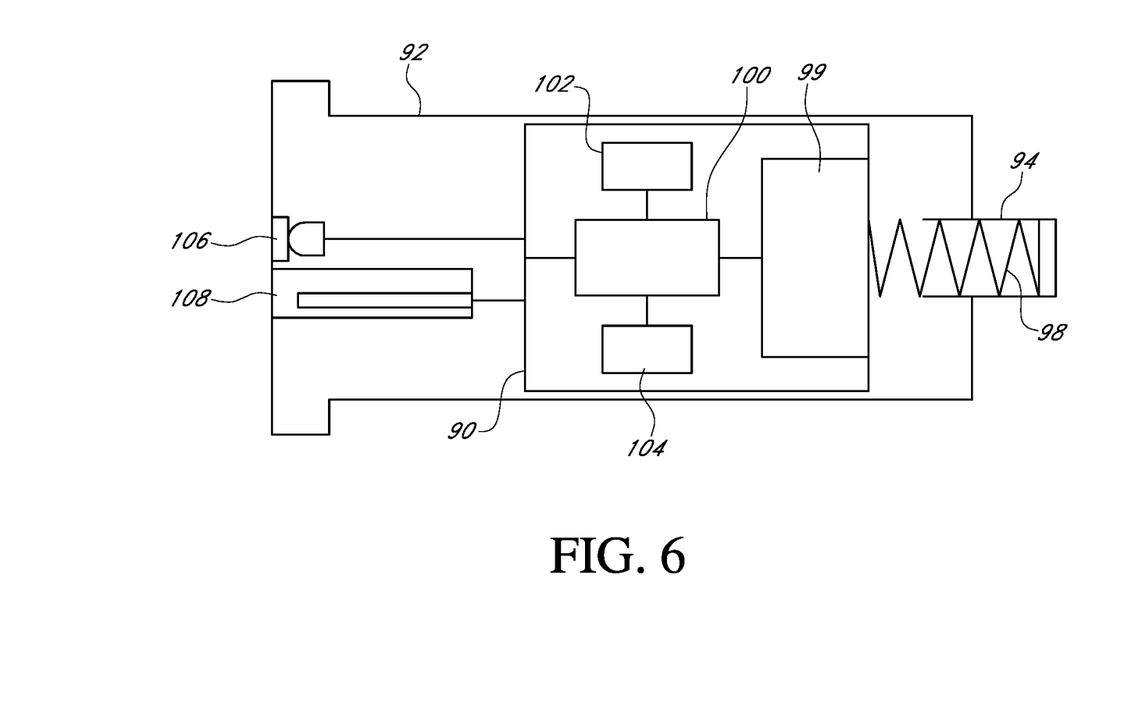
FIG. 6 is a cross-sectional view taken along line 6-6 of FIG. 5, and showing certain electrical components schematically.

With reference again to FIG. 1 and additional reference to FIGS. 5 and 6, a tractor module 90 preferably can be removably engaged with the tractor power system 26. The illustrated tractor module 90 is enclosed within a module body 92 that resembles a typical charger configured to fit into the power socket 28 of a vehicle. As shown, the module body 92 is elongated, having an electrical contact 94 extending from its distal end, and being configured to contact a node of the power socket 28. A pair of stabilizer springs 96 hold the module body 92 securely within the power socket 28 and preferably electrically contact a second node of the power socket 28 so as to enable electric power from the tractor power system 26 to flow through the module body 92. A spring 98 within the electrical contact 94 communicates electrical current to the tractor module 90, which preferably includes its own power management module 99, microcontroller 100, memory 102 and transceiver 104. An LED-based lamp 106 can be provided at the distal end to provide a user with an indication that the tractor module 90 is powered. If desired, the module body 92 can also be configured to power/charge an electrical component such as a smartphone or tablet, and can include a USB port 108 to that effect. In some iterations the USB port 108 can be configured to have a data connection with the tractor module 90 so as to enable wired data communication between the tractor module 90 and an electronic device coupled to the USB port 108.

Preferably, the tractor module 90, like the trailer module 50, is configured to receive and transmit data communicated through wires of the tractor power system 26 in addition to electrical power. Such data can be communicated through one or more power line communication (PLC) technologies such as HomePlug, and the microcontroller 100 can be configured with a chipset compatible with such PLC technologies, such as the HomePlug AV chipset available from Qualcomm® Atheros®.

With reference again to FIG. 1, when the tractor connector 36 and trailer connector 46 are attached to one another, tractor power system 26 and the trailer power system 38 are connected to one another. As such, electricity can flow from the tractor power system 26 to the trailer power system 38. Additionally, data can be communicated between the tractor module 90 and trailer module 50 via the tractor power system 26 and the trailer power system 38 using PLC technology.

In operation, a user, most preferably a driver of the tractor 20, can have a driver device 110, which can be a mobile electronic device with computing and wireless communications capability such as a smartphone, tablet, laptop computer or the like. The driver device 110 preferably is enabled for near-field wireless communication, such as via Bluetooth®. The transceiver 104 of the tractor module 90 preferably is also enabled for near-field wireless communication such as via Bluetooth®. Thus, the driver device 110 can electronically communicate data to and from the tractor module 90 when the tractor module 90 is powered on. In some iterations the driver device 110 can also be configured to communicate with the tractor module 90 via a wired communication link by connecting the driver device to the USB port 108 of the tractor module 90.

With continued reference to FIG. 1, preferably the driver device 110 is also configured for multiple types of wireless data communications, such as Wi-Fi and cellular network communications, and as such can communicate through a cellular network 112 and/or internet with the TMS, such as through a TMS server 114. Preferably, at least the trailer module 50 cellular modem 76 and antenna 78 are also configured to communicate through the cellular network 112 with the TMS server 114. As such, the tractor module 90 (via the driver device 110) and trailer module 50 can readily send and receive data from the TMS server 114 through a wireless connection, and can readily send and receive data between one another via a PLC connection. Notably, in view of the PLC communication ability of the tractor module 90 and trailer module 50, the tractor power system 26 and trailer power system 38 can be configured with power wires only, and need not have any data-specific wires, as PLC communication is accomplished via the power wires.

The arrangement discussed above, and variations thereof, can improve matching of drivers and tractors 20 with correct trailers 22 so as to avoid mistakenly hauling the wrong trailer. With continued reference to FIG. 1 and additional reference to FIG. 7, in operation, the trailer 20 can be loaded 120 with a cargo. The TMS server 114 can be updated 122 with an identification of the cargo that was loaded, as well as the trailer ID of the trailer 22 onto which the cargo was loaded. Such data updates can be saved to the TMS server. Preferably, the trailer ID of the trailer 22 is also saved in the memory 70 of the trailer module 50. The TMS 114 can create 124 a digital waybill having information concerning the cargo, the trailer ID, as well as additional information such as the shipper, consignee, originating location, destination, special instructions, and the like. The digital waybill can be assigned 126 to a driver, such as by adding the driver ID to the digital waybill. Waybill data can then be sent 128 to the driver, such as by the driver downloading the waybill data from the TMS server 114 to the driver device 110. Preferably, a TMS app is loaded on the driver device 110 and is associated with the driver ID, such as via a login. The driver ID can also be saved on the TMS server 114. The TMS app loaded on the driver device 110 is configured to communicate in an organized manner with the TMS server 114.

Figure 7:
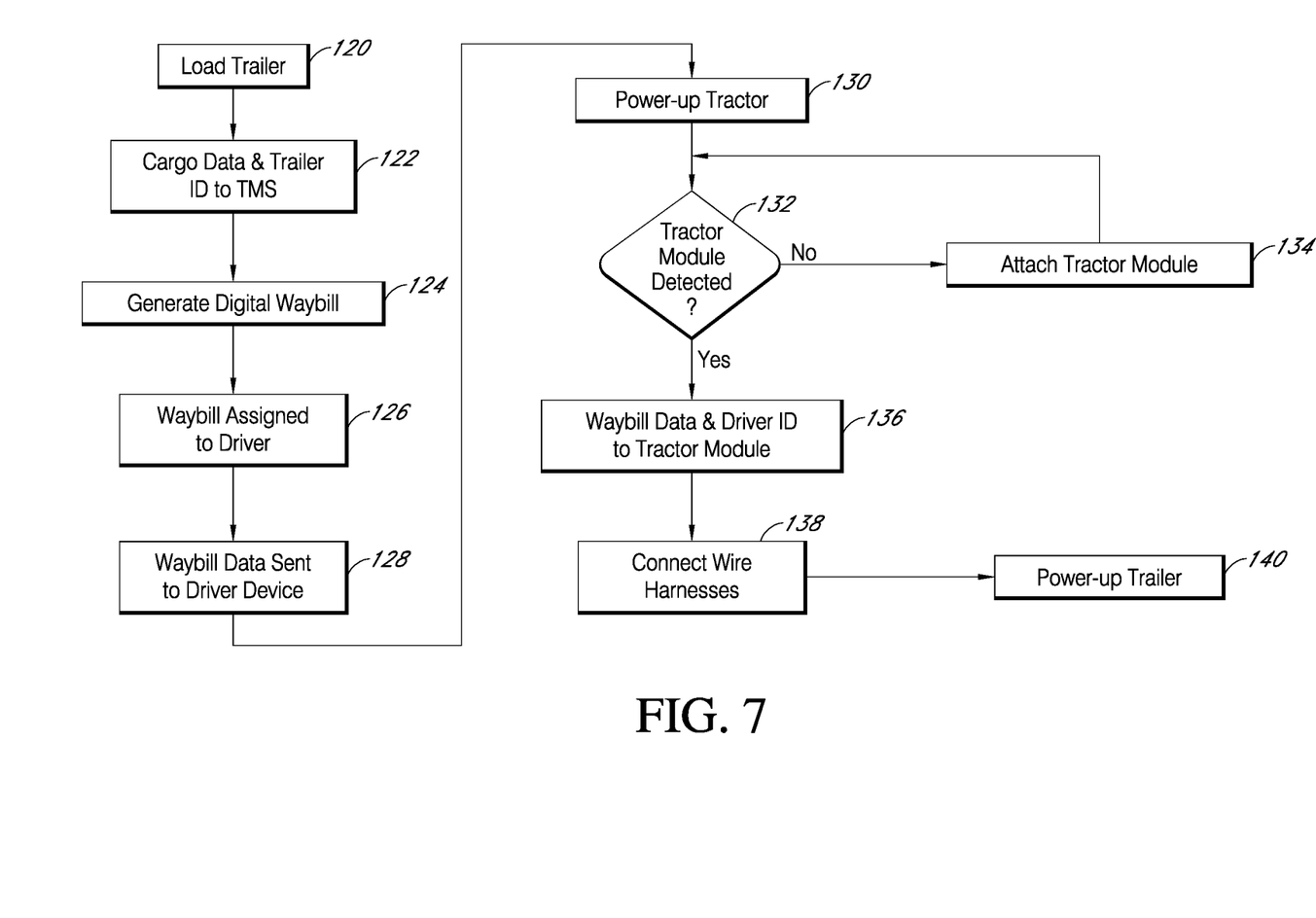
FIG. 7 is a flow chart depicting operation of a portion of the system involving the tractor module.

When the tractor power system 26 is powered up 130, the driver device 110 can query 132 to detect the tractor module 90. If the tractor module 90 is not found, the driver can ensure the tractor module 90 is properly attached 134, such as to the power socket 28. Once the driver device 110 has detected and established communication with the tractor module 90, the tractor module 90 and driver device 110 can be linked, and waybill data and the driver ID can be communicated 136 from the driver device 110 to the tractor module 90, where it can be saved in the memory 102. A module ID can also be saved in the memory 102 of the tractor module 90, and can be associated with the driver device 110 and corresponding driver. In some configurations a dispatcher can have a plurality of tractor modules 90, with each module ID recorded in the TMS server 114. The dispatcher can issue one of the tractor modules 90 to the driver, and can record the module ID as being assigned, or linked, to the driver.

The tractor 20 can be connected to, or hooked up with, the trailer 22, and the tractor and trailer wire harness connectors 36, 46 can be connected 138 to one another. Thus electrically connected to the tractor power system 26, the trailer power system 38 can be powered up 140. The tractor module 90 and trailer module 50, which are both compliant with PLC technology, can then communicate with one another via the connected tractor power system 26 and trailer power system 38.

Figure 8:
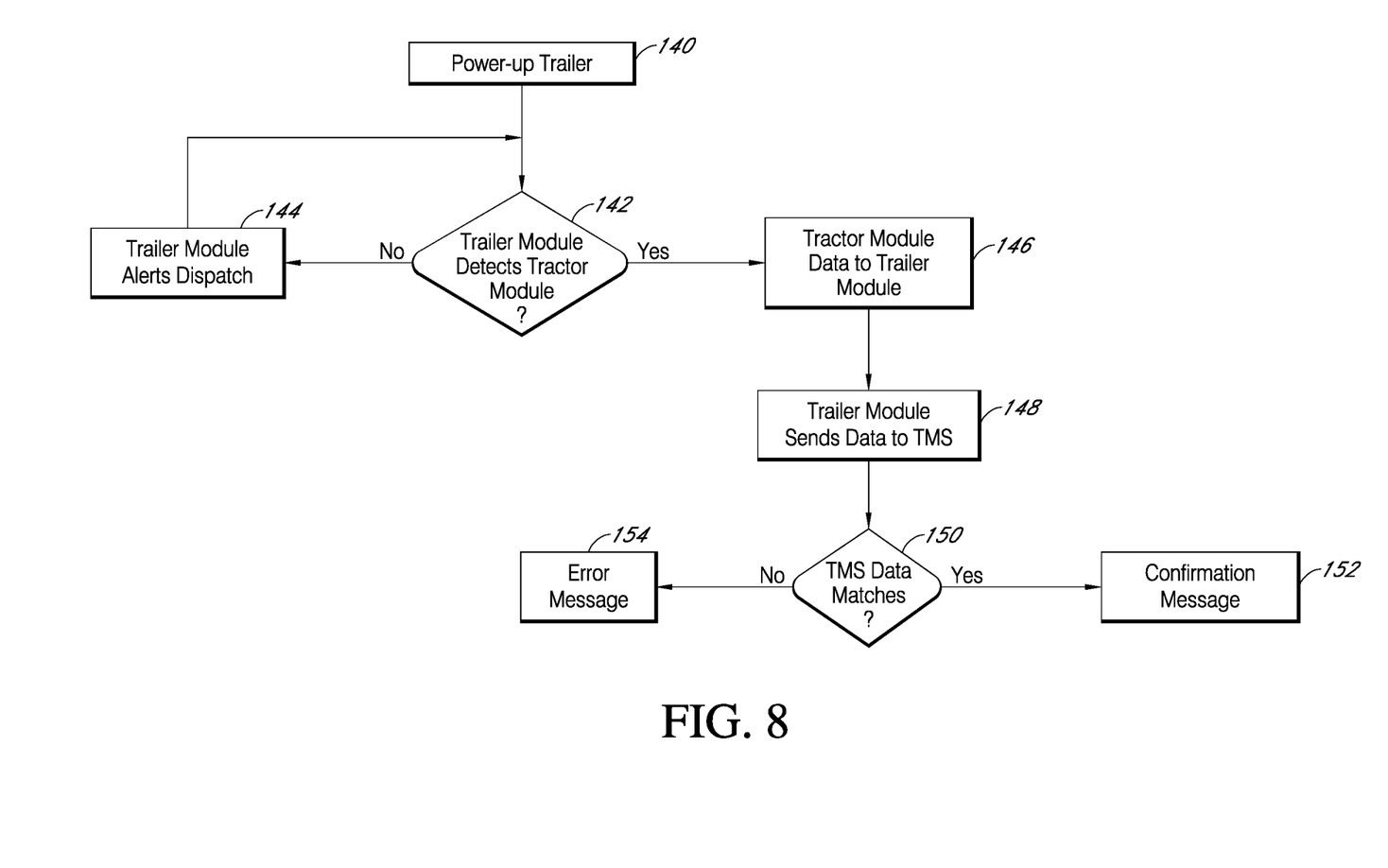
FIG. 8 is a flow chart depicting operation of a portion of the system in accordance with one embodiment.

With additional reference to FIG. 8, once the trailer 22 is powered up 140, the trailer module 50 can query 142, via PLC, to detect the tractor module 90. If the tractor module 90 is not detected, the trailer module 50 can send an alert 144 wirelessly (such as by the cellular antenna) to a dispatch organization associated with the TMS indicating that a tractor 20 has hooked up to the trailer 22 without presenting any waybill data, which indicates an error, or worse indicates that the trailer 22 may be being stolen. Preferably, however, the trailer module 50 will continue to query 142 so as to detect the tractor module 90.

If and when the tractor module 90 is detected by the trailer module 50, and communication between the modules 90, 50 is established via PLC, data from the tractor module 90, such as the driver ID and, in some instances, waybill data, is communicated 146 to the trailer module 50 and preferably stored in memory 70. The trailer module 50 then adds data such as the trailer ID, and sends 148 the data to the TMS server 114 via an antenna, which compares 150 data received from the trailer module 50 to expected data saved on the digital waybill in the TMS server 114. If the data matches, a confirmation message can be sent 152 by the TMS server 114 to the driver device 110 and/or to the dispatch organization to confirm that the driver has hooked up the tractor 20 to the right trailer 22. If, however, the data received by the TMS server 114 from the trailer module 50 does not match, an error message can be sent 154 by the TMS server 114 to the driver device 110 and/or to a dispatcher to alert them that there is an error. The driver and dispatcher can then investigate further and work to correct the error, most likely by identifying the correct trailer.

Figure 9:
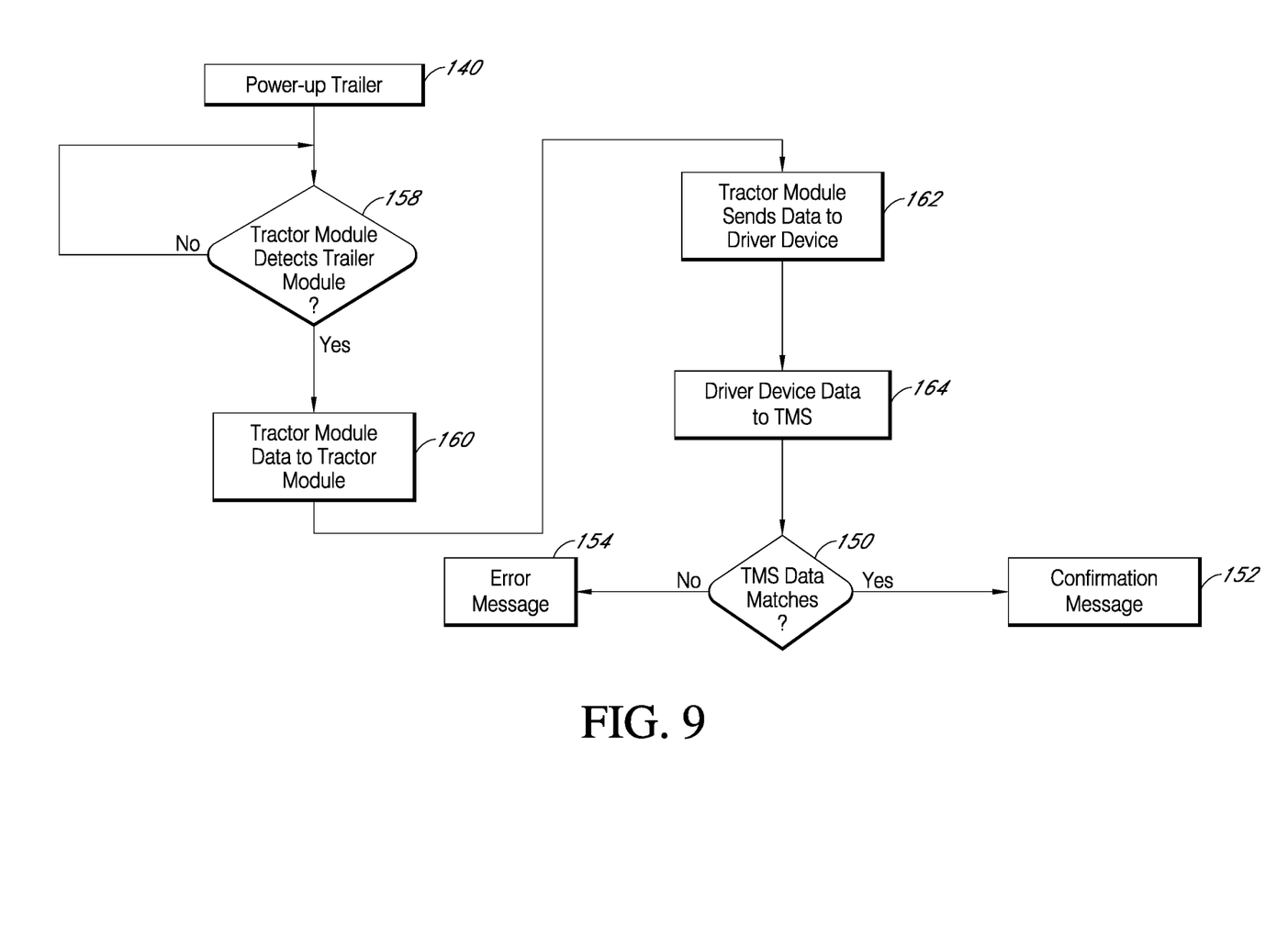
FIG. 9 is a flow chart depicting operation of a portion of the system in accordance with another embodiment.

With continued reference to FIGS. 1 and 7 and additional reference to FIG. 9, in another embodiment, once the trailer is powered up 140, the tractor module 90 can query 158, via PLC, to detect the trailer module 50. The query 158 can be repeated until the trailer module 50 is detected. Once detected, communication between the modules 50, 90 is established, and data from the trailer module 50, such as the trailer ID, is communicated 160 to the tractor module 90 and preferably held in memory 102. The tractor module 90 communicates 162 such data to the driver device 110, which can add data such as the driver ID and certain waybill data and send 164 such data to the TMS server 114. The TMS server 114 can compare 150 data received from the driver device 110 to expected data saved on the digital waybill in the TMS server 114. If the data matches, a confirmation message can be sent 152 by the TMS server 114 to the driver device 110 and/or to the dispatcher to confirm that the driver has hooked up the tractor 20 to the right trailer 22. If, however, the data received by the TMS server 114 from the driver device 110 does not match, an error message can be sent 154 by the TMS server 114 to the driver device 110 and/or to the dispatcher to alert them that there is an error. The driver and dispatcher can then investigate further and work to correct the error, most likely by identifying the correct trailer.

It is to be understood that the discussion above presents a specific embodiment and variations thereof, and that inventive principles discussed herein can be practiced using different specific structure and components. For example, in another configuration, waybill data, including driver ID and/or tractor module 90 ID can be loaded onto the trailer module 50 during or after cargo loading. Such data loading can be accomplished by wireless communication from the TMS server 114 and/or another source. When, after the tractor 20 and trailer 22 are hooked up, the tractor module 90 communicates data concerning the waybill, driver ID, module ID and the like to the trailer module 50, the microcontroller 66 of the trailer module 50 can compare the data received from the tractor module 90 with data already stored in its memory 70 to determine whether or not the trailer 22 has been hooked up to the correct tractor 20. A confirmation or error message can then be transmitted by the trailer module 50 to the TMS server 114 and/or driver device 110. Similarly, the appropriate trailer ID can be downloaded with waybill data to the driver device 110 and passed on to the tractor module memory 102. As such, when the tractor 20 and tractor module 22 are hooked up, the trailer module 50 will communicate its trailer ID to the tractor module 90, where it will be compared with the trailer ID as included in the downloaded waybill data. The tractor module 90 can then communicate confirmations or error messages to the driver device 110, which in turn can communicate the message to the TMS server 114.

In the discussion above, the tractor module 90 is an independent mobile device that is removably connected to the tractor power system 26. In an additional configuration the tractor module 90 can be permanently installed in the tractor 20 so as to be a permanent part of the tractor power system 26. Preferably, the tractor module 90 is installed in a hidden manner so as not to be detected by a potential thief. In still another configuration, the driver device 110 can also be installed as a permanent component in the cab 24 of the tractor 20. Such a driver device 110 can be configured so that a driver assigned to drive the particular tractor 20 can log in to the driver device 110 so that the driver's driver ID becomes associated with the tractor module 90, and the waybill data can be downloaded from the TMS server 114 to the driver device 110 and passed along to the tractor module 90. Similarly, in further configurations the tractor module 90 can be incorporated into other components within the tractor cab 24. For example, may tractor cabs 24 have an electronic logging device (ELD) for tracking a particular driver's hours of service, breaks and the like. The ELD is plugged into the tractor power system 26. In an additional configuration the tractor module 90 can be incorporated into an ELD.

Similarly, in other embodiments the trailer module can be located separately from the tail light 48 and configured somewhat differently. For example, with reference again to FIG. 1, the trailer module 50a can be placed elsewhere on the trailer 22, such as on a roof of a box trailer. The trailer module can also be included with other structure so as to be both protected from elements and disguised or hidden from view of a potential thief. For example, the trailer module can be included within the trailer power interface 40, trailer connector 46, or even within the housing of other components such as a refrigeration unit 49. Such a trailer module 50 can include components as discussed above. In other iterations, the trailer module 50 can be more simple, such as lacking wireless and/or GPS capability. As such, when the tractor power system 26 and trailer power system 38 are connected, and data communication is established via PLC between the tractor module 90 and trailer module 50, the trailer module 50 can communicate its trailer ID to the tractor module 90, and data comparison can be performed at the tractor module 90, which can also generate confirmation or error messages delivered to the driver device 110.

In the illustrated embodiment, a tractor 20 is hooked up to a single trailer 22. It is to be understood, however, that inventive principles discussed herein can be employed in instances in which a single tractor 20 is hooked up to multiple trailers 22. In such instances the tractor power system 26 is attached to the trailer power system 38 of a first trailer, and the trailer power system 38 of a second trailer is attached to the trailer power system 38 of the first trailer. It is anticipated that both trailers will have a trailer module 50, which modules can communicate data between one another and the tractor module 90 via PLC. Further, the trailer module microcontrollers 66 can be specifically configured to look for, collect and, if appropriate, store data from another trailer(s). Still further, the waybill data transmitted to the driver device 110 can indicate all trailers 22 intended to be hooked up to the tractor 20 for a particular voyage, and the tractor module 90 microcontroller 102 can be configured to request and obtain data relevant to all such trailers 22.

Further, it is to be understood that the waybill data discussed herein is intended to encompass shipping data concerning the cargo in order to both track and verify the cargo and give instructions and information to the driver. Such waybill data is not intended to be limited to any particular format, and may include data typically included on one or more of several shipping documents such as bills of lading, written or electronic waybills, or shipping contracts. Also, when waybill data is communicated to a driver device, the data communicated may be less or more than the extent and detail of shipping data maintained on the TMS server.

In another aspect, an electronic logging device (ELD) which may be compliant as a power line communication device such as the tractor module and the trailer module may installed or disposed within or on the tractor. The ELD may communicate with the TMS (i.e., wirelessly, via bluetooth or wifi) and track driving hours to determine whether the driver is driving more than permitted and whether breaks are being taken at the prescribe times.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A cargo verification system, comprising:
   a transportation management system (TMS) server configured to generate digital waybill data concerning a cargo that has been loaded onto a trailer, the TMS configured to wirelessly communicate the digital waybill data to a driver mobile device;
   a tractor module configured to wirelessly communicate with the driver mobile device and to be powered by a tractor power system of a tractor, the tractor module receiving a driver ID and the digital waybill data from the driver mobile device; and
   a trailer module in electrical communication with a trailer power system of the trailer, the trailer module maintaining a trailer ID of the trailer in a data memory, wherein the trailer module is disguised as a tail light;
   wherein the tractor module and the trailer module are configured to exchange data therebetween via power line communication (PLC) when the tractor power system and the trailer power system are connected to one another,
   wherein at least one of the tractor module and trailer module is configured to compare the trailer ID and driver ID to the digital waybill data to determine whether the digital waybill data is consistent, generate a confirmation message if the comparison is consistent with the digital waybill data, and generate an error message if the comparison is inconsistent with the digital waybill data, and
   wherein the confirmation message or error message is transmitted to the driver mobile device and the TMS.

2. The system of claim 1, wherein the trailer module is configured to communicate the trailer ID and data received from the tractor module to the TMS by wireless communication.

3. The system of claim 1, wherein the tractor module is configured to communicate the driver ID and the trailer ID received from the trailer module to the driver mobile device, and the driver mobile device is configured to communicate the driver ID and the trailer ID to the TMS.

4. The system of claim 1, wherein the tractor module is releasably connected to the tractor power system.

5. A cargo verification method, comprising:
   generating, by a transportation management system (TMS) server, digital waybill data concerning a cargo that has been loaded onto a trailer,
   wirelessly communicating, by the TMS to a driver mobile device, the digital waybill data;
   wirelessly communicating, by the driver mobile device to a tractor module configured to be powered by a tractor power system of a tractor, a driver ID and the digital waybill data;
   maintaining, by a trailer module in electrical communication with a trailer power system of the trailer, a trailer ID of the trailer in a data memory, wherein the trailer module is disguised as a tail light;
   exchanging data between the tractor module and the trailer module via power line communication (PLC) when the tractor power system and the trailer power system are connected to one another;
   comparing, by at least one of the tractor module and trailer module, the trailer ID and driver ID to the digital waybill data to determine whether the digital waybill data is consistent;
   generating, by at least one of the tractor module and trailer module, a confirmation message if the comparison is consistent with the digital waybill data or an error message if the comparison is inconsistent with the digital waybill data; and
   transmitting, by at least one of the tractor module and trailer module to the driver mobile device and the TMS, the confirmation message or the error message.

6. The method of claim 5, wherein the trailer module is configured to communicate the trailer ID and data received from the tractor module to the TMS by wireless communication.

7. The method of claim 5, wherein the tractor module is configured to communicate the driver ID and the trailer ID received from the trailer module to the driver mobile device, and the driver mobile device is configured to communicate the driver ID and the trailer ID to the TMS.

8. The method of claim 5, wherein the tractor module is releasably connected to the tractor power system.

* * * * *